United States Patent Office 3,305,312
Patented Feb. 21, 1967

3,305,312
SYNTHESIS PROCESS
Norman Jacob Weinstein, Baton Rouge, La., and Richard R. King, Lima, Peru, assignors to Esso Research and Engineering Company, a corporation of Delaware
No Drawing. Filed Mar. 12, 1963, Ser. No. 264,692
7 Claims. (Cl. 23—199)

This invention relates to a process for the direct reduction of iron ore and the manufacture of ammonia. More particularly, this invention is related to the process of directly reducing iron ore in a fluidized bed reactor wherein the reducing gases required for the reduction reaction are supplied by partial oxidation of a carbonaceous fuel with air plus steam, or oxygen enriched air with or without steam, whereby, efficient use is made of the off gas from the iron ore reduction process to convert nitrogen and hydrogen present in the off gas into ammonia. In its more particular aspects the present invention is concerned with a process wherein the off gas from an iron ore reduction process is controlled in composition so that the off gas can be used in an ammonia synthesis process.

By combining an iron ore reduction process and an ammonia synthesis process, it is found the combined processes require less fuel than the fuel requirements of the two processes carried out separately. Specifically, this invention describes a process whereby the degree of enrichment of the air (with oxygen and steam) used for partial combustion of the carbonaceous fuel, and the heat added are controlled to provide sufficient reducing gas atmosphere for the reduction of the iron ore, and to have enough $H_2$ plus $CO$ remaining after reduction to provide an economic feed to an ammonia synthesis process.

Direct reduction of iron ore with synthesis gas is well known in the art as is the production of ammonia from hydrogen and nitrogen. Iron ore reduction has been carried out in fluidized beds and a desirable reducing gas has been pure hydrogen. Pure hydrogen, however, is expensive, difficult and dangerous to handle, and would necessitate adding large amounts of heat in order to provide the heat for the endothermic reduction of the iron ore to metallic iron using only hydrogen as the reducing gas. The manufacture of $H_2$ is complex and costly. The usual method of preparation requires that a carbonaceous fuel be reformed in the presence of steam or a mixture of steam and pure oxygen to produce a gas containing hydrogen and carbon monoxide. The effluent gas is cooled and subjected to a water gas shift in the presence of additional steam whereby almost all the carbon monoxide is converted to hydrogen with the simultaneous formation of carbon dioxide. The gas must then be cooled to remove water and scrubbed to remove carbon dioxide. Small amounts of methane or carbon monoxide are undesirable, and further purification may be required. In order to use this pure $H_2$ for iron ore reduction a high level of preheat must be supplied indirectly.

Even when synthesis gas containing carbon monoxide and hydrogen replaces hydrogen as a reducing gas in iron ore reduction, one of the major expenses is the expense of producing the reducing gas. Because of the high cost of providing reducing gas to iron ore reduction, it would seem desirable to recycle unconverted off gas to minimize consumption of reducing gas. After passage of the synthesis gas through the iron ore bed, a considerable amount of water and $CO_2$ which are oxidation products of the reduction, accumulate in the synthesis gas and the ratio of $CO+H_2$ to $CO_2+H_2O$ must be carefully controlled so that the system does not become oxidizing rather than reducing. In order to maintain a reducing atmosphere, the off gas from the reduction reaction is cooled, compressed, and water is condensed. The $CO_2$ may be removed by $CO_2$ scrubbers. The gases, after removal of $H_2O$ and $CO_2$, are recycled to the reducing zone.

In order to carry out reducing gas recycle, it is desirable that the original reducing gas be almost entirely free of gases such as nitrogen which do not enter into the reduction reaction, and which cannot be economically removed from the reaction system. When inert gases, such as nitrogen are present, recycle of the off gases from the reduction reactor would build up the inert concentration to a large fraction of the total gas. After several cycles, the large fraction of nitrogen in the reducing gases would render the gas ineffective to carry out the reduction due to dilution. Furthermore, the presence of a large inert diluent in the reducing gas means carrying along a component which performs no function, yet heating, cooling, and compressing this component, which is an additional burden on the process, increases the burden on the equipment and the cost of all the adjacent equipment as well. Thus, one requirement of a recycle reduction system is that the original reducing gas be made without the use of air, which would introduce nitrogen into the system. This requires that a carbonaceous fuel be partially oxidized with pure oxygen, which is expensive, and dangerous to handle; or that a carbonaceous fuel be catalytically reformed in the presence of excess steam, which requires expensive equipment for indirect heat transfer, requires the use of excessive fuel and large quantities of steam, and requires cooling, scrubbing and reheating to supply a gas of sufficient reducing power to be effective in iron ore reduction. In summary, the cost of recycle and the necessity for providing a reducing gas free of inert material make reduction with recycle expensive.

In order to overcome the expense and difficulties of using pure oxygen or catalytic steam reforming, it has been suggested that the partial combustion of the carbonaceous fuel used to produce reducing gas be carried out using air or oxygen enriched air followed by once-through reduction. However, because of the limitations imposed by the thermodynamic equilibrium during reduction of FeO to Fe with reducing gases containing hydrogen and carbon monoxide, the off gas from once-through reduction contains considerable unreacted hydrogen and carbon monoxide. Such a process tends to be wasteful of reducing gas. Furthermore, because of the presence of nitrogen introduced during gasification and the $CO_2$ and $H_2O$ formed during reduction, the off gas from once-through reducation has a low heating value and, therefore, is of little use as a fuel.

The off gases normally produced with reducing gases made by partially oxidizing carbonaceous fuels in the presence of oxygen enriched air are not suitable for the synthesis of ammonia in that they have an extremely high concentration of nitrogen in relation to $H_2$, which, in order to obtain an efficient feed for the ammonia synthesis reaction, would require adding substantial amounts of pure hydrogen to the synthesis feed to the ammonia synthesis reaction. For example, the nitrogen concentration of the off gas of a direct reduction iron ore process may be as high as 50 to 75% nitrogen. In order to obtain a feed to an ammonia synthesis reaction, it is necessary that the feed contain a ratio of hydrogen to nitrogen of substantially 3.

In carrying out the direct reduction of iron ore one is faced with severe limitations in the choice of a suitable reducing gas. On the one hand, the production of pure $H_2$, or synthesis gas free of inerts, is wasteful of fuel, as by catalytic steam reforming, or requires the use of pure oxygen, which is expensive and difficult to handle. Recycle of off gases to minimize consumption of these expensive reducing media requires additional expensive facilities for cooling, purification, compression and reheating. On the other hand, the production of synthesis gas by partial oxidation of carbonaceous fuels with air or oxygen enriched air eliminates the possibility of recycle operation because of the buildup of nitrogen in the system which adds considerable burden to the equipment involved in heating, cooling, and compressing a recycle stream. Once-through reduction with synthesis gas made by partial oxidation with air or oxygen enriched air has the disadvantage of being wasteful of reducing gas.

Feed to ammonia synthesis reaction wherein the feed contains about 3 parts hydrogen to one part nitrogen, utilizes a similar gas generating system, as an iron ore reduction, to make the synthesis gas feed. Normally, a carbonaceous fuel is reformed with oxygen and/or steam at very high temperatures. This requires considerable cooling capacity in order to prepare the feed for the ammonia synthesis reaction, which results in a considerable loss of heat energy due to the cooling of the stream. The most efficient ammonia synthesis process employs a ratio of 3 parts hydrogen to one part nitrogen and a recycle of the unconverted reactants. Once-through ammonia synthesis processes using high nitrogen content feeds are carried out at extremely high pressures and temperatures and have a low conversion factor. By providing a synthesis gas in the proper ratio, it is possible to carry out a relatively low pressure, low temperature ammonia synthesis reaction using recycle of the unconverted components to obtain efficient use of the feed.

The economic success of a direct iron ore reduction plant using a reducing gas depends almost directly on the cost of the reducing gas. The cost of the reducing gas depends mainly upon the method of preparation and upon the efficiency of its use. Hydrogen or inert-free synthesis gas can be used efficiently, but are costly to prepare, and require costly recycle facilities. Synthesis gas made by partial oxidation of carbonaceous fuels with air or oxygen-enriched air, is less costly than hydrogen or inert-free synthesis gas, but cannot be efficiently recycled due to buildup of nitrogen in the reduction system. Once-through use of synthesis gas is wasteful since the off gas contains considerable quantities of unreacted hydrogen and carbon monoxide. Furthermore, because of its nitrogen content, synthesis gas made by partial oxidation with air or oxygen enriched air used once-through for reduction of iron ore results in an off gas which has little value even as fuel because of its low heating value. One way to make the reducing gas less expensive is to find an efficient high value use for the off gas.

In the synthesis of ammonia, it is desirable to obtain the proper ratio of hydrogen to nitrogen in the feed to the synthesis reaction. The feed gas for ammonia synthesis, containing 3 parts hydrogen per part of nitrogen by volume is ordinarily prepared by partial oxidation of a carbonaceous fuel with relatively pure oxygen plus steam, followed by shifting carbon monoxide to hydrogen, gas purification and nitrogen addition, or by reforming with steam and air, followed by shifting and gas purification. Either method of preparation represents a major portion of the cost of ammonia preparation. If a feed with the proper hydrogen to nitrogen ratio can be obtained without the necessity of separate gasification equipment, ammonia synthesis would be less complex and ammonia would be made more inexpensively. Successfully combining a direct iron ore reduction process with an ammonia synthesis process requires that the gasification reaction using oxygen enriched air be controlled so that there is sufficient carbon monoxide plus hydrogen in the generated gas to efficiently carry out the iron ore reduction process and to have a sufficiently high ratio of carbon monoxide plus hydrogen to nitrogen so that after reduction there remains substantially three parts of carbon monoxide plus hydrogen to one part of nitrogen. The remaining carbon monoxide can be easily converted to hydrogen by the water gas shift reaction so that the gas containing three parts of hydrogen to one part of nitrogen can be used in the ammonia synthesis reaction. In this manner, a once-through direct iron ore reduction process can be carried out without the need and expense of the auxiliary equipment for recycling the off gas and the off gas can be directly used in proper ratios of hydrogen to nitrogen in the ammonia synthesis reaction. By having the correct hydrogen plus carbon monoxide to nitrogen ratio in the off gas it is not necessary to add pure hydrogen or pure nitrogen to the ammonia synthesis reaction feed.

It is an object of this invention to provide an inexpensive source of reducing gas to carry out a direct iron ore reduction process, which allows for a once-through use of the reducing gas without necessitating recycle of the reducing gas and allows a high value use of the off gas, i.e., to make ammonia. It is a further object of this invention to produce a combination iron ore reduction and ammonia plant which uses a simplified gasification procedure having a reduced fuel consumption as compared to the fuel requirements for both plants operated separately. It is a further object of the present invention to supply a gas to an iron ore reduction process such that when purified the off gas will yield a stream having the proper ratio of hydrogen to nitrogen for an efficient ammonia synthesis process. It is a further object of this invention to provide a balanced system whereby air plus steam or oxygen enriched air with or without steam is used partially to oxidize a carbonaceous fuel to produce a reducing gas which can be used for direct iron ore reduction whereby the off gases of the reduction step may be used after minor purification as the feed to an ammonia synthesis reaction without the necessity of adding pure hydrogen or pure nitrogen to the feed of the ammonia synthesis reaction.

The problem of producing a cheap, inexpensive, reducing gas for carrying out direct iron ore reduction in the fluidized iron ore reducing zone and producing an off gas suitable for efficiently carrying ammonia synthesis is solved by utilizing air plus steam or oxygen enriched air with or without steam in carefully controlled proportions to paritally oxidize a carbonaceous fuel to produce the reducing gases for the iron ore reduction. Applicants have found that this off gas after suitable purification treating steps can be used as efficient ammonia synthesis gas to an ammonia syntheisis reaction zone. By providing the high value use of the off gases, a once-through system for the iron ore reduction without recycle and without cooling of the reducing gases may be efficiently used.

In accordance with this invention, the amount of steam added and the degree of oxygen enrichment in the air which is used to partially oxidize the carbonaceous fuel which is used to generate the reducing gas for the iron ore reduction zone are critical and are controlled in such a manner that sufficient carbon monoxide plus hydrogen is generated in the gas generation zone to have sufficient reducing capacity to reduce the iron ore in the iron reduction zone and still have sufficient carbon monoxide plus $H_2$ to $N_2$ after reduction to have a ratio of substantially three in which case after shift conversion of the CO, the $H_2$ to $N_2$ ratio is still substantially three.

The complexity of the combined process is substantially less than if the iron ore reduction and the ammonia synthesis processes were carried out separately since the gasification unit supplies both a desirable reducing gas for the iron ore reduction and a synthesis gas feed with the necessary hydrogen to nitrogen ratio for ammonia manufacture. This combination of process steps made possible by specifying the critical features of gasification, i.e., the degree of oxygen enrichment and the steam addition, allows the use of once-through reduction by making possible a high value use for the off-gas. Once-through reduction eliminates the necessity for producing a reducing gas free of inert gas and also eliminates expensive process steps necessary for recycle, such as cooling, scrubbing, compression, and reheating.

The fuel requirements of the combined process are substantially less because the gasification unit functions to produce the synthesis gas for both the iron ore reduction and ammonia synthesis reaction and the excess heat, which would normally be produced and wasted in the ammonia synthesis gasification reaction, is utilized in the iron ore endothermic reduction reaction. Therefore, balance of heat and efficient utilization of gases produced, renders the combined processes substantially more economic and more efficient than either process carried out separately. The critical feature is in controlling the oxygen enrichment in the gasification step so that the gas produced can carry out both reactions.

Several advantages accrue from the combination process steps described, one of which is the substantial savings of fuel by carrying out both these processes in combination rather than individually. The same gasification unit is used to carry out both processes which results in substantial savings of equipment. The utilization of the gases produced to a maximum degree cuts the cost of the reducing gas of the iron ore reduction, and using the low value off gases from the iron ore reduction as the feed to the ammonia synthesis plant, reduces the cost of the synthesis gas for the ammonia process.

The combined process also eliminates the need to use pure hydrogen in the reducing zone, pure oxygen in the partial combustion zone, or pure hydrogen or pure nitrogen to obtain the proper ratio of hydrogen to nitrogen in the ammonia synthesis reaction. Other advantages can be incorporated into this combination process. The iron ore fed to the reduction process can be employed as the shift conversion catalyst, making unnecessary the use of expensive shift conversion catalyst, and also providing preheat energy for the iron ore prior to the ore reduction in the iron ore reducing zone. Another advantage is in the gasification to a sufficiently high carbon monoxide plus hydrogen to carbon dioxide plus water ratio so that the gas can be used directly for reduction without cooling to remove water or cooling and scrubbing to remove water and carbon dioxide. This saves equipment and allows use of the sensible heat of the gas to supply necessary heat to the reduction reaction. This reduces fuel requirements for the combination process, since the sensible heat of the gas is ordinarily wasted in preparation of synthesis gas for ammonia production.

This invention provides a balanced system requiring little or no addition of pure $H_2$ or $N_2$ to the reduction stage or the ammonia synthesis stage and requires a minimum amount of pure $O_2$ which is blended with air to be used to partially oxidize the carbonaceous fuel. The gasification step provides heat to the iron ore reduction step and the shift converter reaction provides preheat to the iron ore prior to being introduced into the iron ore reduction zone. A single gasification step provides a high quality reducing gas for the iron ore reduction and a synthesis gas for ammonia manufacture containing the proper ratio of hydrogen to nitrogen. The value of the off gas from ore reduction is substantially upgraded by providing the proper ratio of hydrogen plus carbon monoxide to nitrogen.

The synthesis gas generator or the gasification unit can be used to partially oxidize any carbonaceous fuel such as coal, coke, carbon, or hydrocarbon fuels such as normally liquid or normally gaseous hydrocarbon materials, to obtain carbon monoxide and hydrogen. Suitable hydrocarbon fuels are natural gas (consisting primarily of methane), and liquid hydrocarbons such as naphtha through residual fuel. The carbonaceous fuel is introduced into the gasification unit and is mixed with the prescribed amount of air or oxygen enriched air and steam. The amount of oxygen enrichment and the amount of steam required depends on the particular carbonaceous fuel used, on the carbon monoxide plus hydrogen to carbon dioxide plus water ratio in the gas produced in the gasification unit, and on the degree of conversion of carbon monoxide and hydrogen in the reduction unit. Maximum steam is required with no oxygen enrichment of the air, while maximum oxygen enrichment of the air is required when no steam is added. Depending on the foregoing factors, the percent oxygen in the oxidizing gas may be 21–85 volume percent, with 0–3 lb. moles of steam added per lb. atom of carbon in the fuel. Where oxygen is very costly air could be used as the oxidizing gas with 0.4 to 3 lb. moles of steam added per lb. atom of carbon in the fuel. Considerable heat must be added to the gasification reaction as preheat or process heat when air is used as the oxidizing gas. To minimize heat addition and to operate with less than 0.4 lb. moles of steam added per lb. atom of carbon, the oxidizing gas must be enriched air, the degree of enrichment depending on the particular fuel as follows:

TABLE I

| Atomic ratio of hydrogen to carbon in the fuel: | Percent oxygen in the oxidizing gas |
| --- | --- |
| 4 | 21–65 |
| 3 | 21–70 |
| 2 | 21–75 |
| 1 | 21–80 |
| 0 | 21–85 |

The preferred degree of oxygen enrichment is:

| Atomic ratio of hydrogen to carbon in the fuel: | Percent oxygen in the oxidizing gas |
| --- | --- |
| 4 | 30–60 |
| 3 | 35–65 |
| 2 | 40–70 |
| 1 | 45–75 |
| 0 | 50–80 |

A preferred gaseous hydrocarbon is natural gas, consisting essentially of methane. Using natural gas as an example, and not by way of limitation, gasification is carried out at a temperature in the range of 1500–3000° F. and at a pressure in the range of 1–40 atmospheres. Air may be enriched so that the oxidizing gas contains from 21–85% pure oxygen. With methane as the fuel to be reformed, the oxygen concentration is 21–65% or preferably 30–60%. The natural gas may be preheated so that its temperature is in the range of 60–1800° F. and the oxidizing gas may be preheated so that its temperature is in the range of 60–1200° F. Sufficient oxygen enriched air, natural gas, steam, and heat are added to the gasification unit to maintain the desired temperature and to produce an effluent gas containing a carbon monoxide plus hydrogen to nitrogen ratio of 3.1–4.5. The ratio of carbon monoxide to hydrogen produced is not critical and depends mainly upon the type of fuel being used and the amount of steam reacted. This ratio is not critical because carbon monoxide may be converted to hydrogen in the shift conversion reaction prior to the ammonia synthesis step and because both carbon monoxide and hydrogen are good reducing agents for the iron ore reduction step. Depending on the exact gasification conditions, the ratio of water plus carbon dioxide to hydrogen plus carbon monoxide produced may vary from 0–0.5. When this ratio is low, about 0–0.1, there is normally no necessity for removal of water or carbon dioxide and the reducing gas may be used directly for reduction with little or no cooling. At higher ratios of water plus carbon dioxide to hydrogen plus carbon monoxide, removal of either water only or water plus carbon dioxide is desirable. Water is removed by cooling and condensing, while carbon dioxide may be removed by conventional scrubbing media, such as alkaline solutions, or by adsorption. A catalyst may or may not be used when gasifying light hydrocarbons, but is ordinarily not used when gasifying normally liquid hydrocarbons or solid carbonaceous fuels.

There are any number of suitable gasification generators and gasification processes known in the art which can be used in accordance with this invention. The critical feature in this invention is maintaining the gasification reaction conditions such that proper $H_2+CO$ to $N_2$ ratio in the off gas is sufficient to carry out the iron ore reduction step and to provide the proper ratio for the ammonia synthesis reaction. The iron ore reduction is preferably carried out in a fluidized iron ore reduction zone. The iron ore reducer can contain one or more reduction zones with the following occurring: $Fe_2O_3$ is reduced to Fe, while the reducing gas, i.e., the $H_2$ and the CO, are oxidized to $H_2O$ and $CO_2$, respectively. The conditions in at least one reducing zone are maintained so that the off gases from that zone contain a ratio of $H_2$ plus CO to nitrogen of about 3. The temperatures employed in the iron ore reduction zone will depend on the type of ore being reduced and the number of reducing stages employed. Normally temperatures in the range of 800 to 1800° F. can be used. Usually 1, 2, or 3 reducing stages are used and preferably 2 reducing stages are used. In the first reduction stage the $Fe_2O_3$ is reduced to $Fe_3O_4$ or FeO and in the second reduction stage the $Fe_3O_4$ or FeO is reduced to Fe. The solids passage is by gravity flow and the gases pass countercurrently upward through the solids. Using a two-stage reducing zone the ferric reduction (stage 1) is carried out at a temperature of 800–1700° F. and a ferrous reduction (stage 2) is carried out at a temperature of 800–1800° F. Reduction in both beds is carried out at pressures of 1–40 atmospheres. The reduction conditions are maintained so that the effluent gas has a ratio of CO plus $H_2$ to $N_2$ of about 2.8–3.5. The ratio of $CO+H_2$ to $N_2$ of 3.0–3.3 is useful, and of $CO+H_2$ to $N_2$ of 3.0–3.1 is preferred.

The ratio of $CO+H_2$ to $N_2$ of 3.0–3.1 provides the most desirable crude gas which can be treated to provide the feed to the ammonia synthesis reaction. In carrying out the reaction the allowable ratio of water to hydrogen and carbon dioxide to carbon monoxide are limited by thermodynamic equilibrium. To prevent reoxidation of reduced iron and to maintain reasonable high reduction rates, the effluent gas from the ferrous reducer will ordinarily contain a water plus carbon dioxide to hydrogen plus carbon monoxide ratio of 0.03–0.5. All or part of this gas may be withdrawn for use in the ammonia synthesis process. Superficial gas velocity through the iron ore reduction reactor will ordinarily be 1–5 ft./sec. From 0.03 to 0.3 lb. moles of metallic iron will normally be produced per lb. mole of hydrogen plus carbon monoxide entering the reducer. Total height of the fluidized beds of solids will be between 10 and 60 feet.

The gases leaving the reducer with a hydrogen plus carbon monoxide to hydrogen ratio of about 3, are cooled indirectly or directly with water to a temperature favorable to shifting carbon monoxide to hydrogen in the presence of steam. The water shift conversion of these crude off gases to convert the remaining CO to an equivalent amount of $H_2$ is carried out in a conventional manner. Suitable temperatures of 600–1000° F. may be used in a shift conversion zone and pressures of 1–40 atmospheres. In the shift conversion zone substantially all the carbon monoxide present is converted to hydrogen by the addition of a sufficient amount of steam to drive the reaction essentially to completion so that only a small amount, if any, of carbon monoxide remains in the gas.

The effluent gases from the shift conversion zone consists essentially of hydrogen, carbon dioxide, nitrogen, water and a small amount of carbon monoxide. In order to prepare the feed for the ammonia synthesis reaction, the $CO_2$, $H_2O$ and CO are removed. These are removed by cooling the effluent gas to condense out the water, and the remaining gases are fed to conventional $CO_2$ and CO scrubbers to remove $CO_2$ and CO.

The resulting ammonia synthesis gas consists of hydrogen and nitrogen at a ratio of hydrogen to nitrogen of substantially 3. The ammonia synthesis reaction is carried out in a conventional manner at a temperature of 750–1200° F. and a pressure of 100–1000 atmospheres. At these temperatures 8–85% conversion of hydrogen and nitrogen to ammonia takes place. Since hydrogen and nitrogen are the only constituents of this feed to the ammonia synthesis reaction, the unconverted hydrogen and nitrogen may be recycled to the ammonia synthesis reaction zone to extinction. There are other known ammonia conversion processes using a feed of three parts hydrogen and one part nitrogen. Therefore, the particular ammonia conversion process selected is not within the scope of this invention and any of the conventional processes may be utilized.

In a preferred embodiment of this invention, natural gas is used as the hydrocarbon fuel and is partially oxidized with oxygen enriched air and the gasification reaction is carried out without a catalyst. The natural gas is preheated to a temperature of about 500° F. by passage through a preheat furnace. To the air to be reacted with the natural gas is added essentially pure oxygen to give a 45–50% concentration of oxygen in the oxygen enriched air. The oxygen enriched air is heated to a preheat temperature of about 1000° F. by passage through a suitable preheat furnace. The preheated air and the preheated natural gas are introduced to the gasification reaction zone. The fuel is partially oxidized with the oxygen enriched air at a temperature of 2100–2700° F. and a pressure of about 10 atmospheres. In the gasification zone, the methane is partially oxidized to form hydrogen and carbon monoxide and small amounts of $CO_2$ and $H_2O$. The effluent gases from the gasification reaction zone have a CO plus $H_2$ to $N_2$ ratio of about 3.4. The CO plus $H_2$ in this gas provides sufficient reducing capacity to carry out the iron ore reduction and to have after the iron ore reduction sufficient CO plus $H_2$ to $N_2$ to provide a crude ammonia synthesis reaction feed. The reaction gases withdrawn from the gasification reaction zone may be condensed to remove water and scrubbed to remove carbon dioxide. Small amounts of water or steam are added to the gasification zone as required to maintain a gasifiaction reaction temperature of 2100–2700° F. The critical feature of this invention is to adjust the amount of oxygen enrichment in the air fed to the gas generator to give a gas product having sufficient amounts of CO plus $H_2$ to $N_2$ to carry out both the iron ore reduction and the ammonia synthesis reactions. During the reduction of the iron ore to metallic iron, some of the CO is converted to $CO_2$ and some of the $H_2$ to $H_2O$. There must be a sufficiently high ratio of CO plus $H_2$ initially so that the ratio of the off gases from the iron ore reduction zone have a CO plus $H_2$ to $N_2$ ratio of about 3.0. The ratio of $H_2$ to CO from the synthesis gas generator when using natural gas is not critical and is generally about 2.

Effluent gases from the gasification and subsequent purification zone, if used, consisting essentially of carbon monoxide, hydrogen and nitrogen, are preheated in a furnace and fed to the second stage of the iron ore reduction zone. The iron ore reduction is preferably carried out in two stages. In a first stage the $Fe_2O_3$ is reduced to $Fe_3O_4$ or FeO, and in the second stage the $Fe_3O_4$ or FeO is reduced to metallic iron. To carry out the iron ore reduction in two stages, the ferric reducing stage is generally at a temperature of about 1200–1600° F. and a ferrous reduction stage is generally at a temperature of 1100–1500° F. The pressure in both reduction stages is about 2–12 atmospheres.

The iron ore is fed into stage 1 from a suitable source and is fluidized in the iron ore reduction zone by the reducing gases leaving stage 2. The reducing gases from the gasification unit fluidize the ferrous iron ore in stage 2, pass up through stage 2 to a suitable gas distributor and fluidize the iron ore in stage 1. The iron ore passes by gravity through stage 1 being reduced from $Fe_2O_3$ to $Fe_3O_4$ or FeO, into stage 2 where it is reduced to metallic iron. Metallic iron is withdrawn from the bottom of the unit as the product. The product is suitably treated prior to being sent to storage to render it non-pyrophoric. The reducing gases enter the reactor through stage 2, proceed to stage 1, and are taken off overhead. The effluent overhead gases or off gases from the iron ore reduction consist essentially of CO, $H_2$, $N_2$, $CO_2$ and $H_2O$. The reaction conditions in the reducing zone are maintained so that the ratio of CO plus $H_2$ to $N_2$ is substantially 3.0–3.1. The ratio of $CO_2$ plus $H_2O$ to CO plus $H_2$ is about 0.1–0.2. This ratio cannot be allowed to become too large in that there is a danger of back oxidation of the reduced iron ore if the concentration of $CO_2$ plus $H_2O$ becomes too high. The overhead gases from the iron ore reduction zone are at a temperature of 1200–1600° F.

Water is injected directly into the hot overhead gases from the iron ore reduction zone and is vaporized to steam and the mixture injected into the water gas shift reaction zone. Iron ore is introduced continuously to a fluidized bed shift converter where it is preheated by the hot gases from the reaction zone and acts as the catalyst for the water gas shift reaction. In the water gas shift reaction zone, unconverted CO in the overhead gases from the iron ore reduction zone are reacted with $H_2O$ to convert the CO to $CO_2$, and the $H_2O$ to $H_2$. Sufficient water is added to cause a substantially complete conversion of CO to $H_2$ in this reaction. The reaction is carried out at pressure at 2–12 atmospheres and a temperature of 600–900° F.

Iron ore employed as catalyst in the water gas shift reaction zone can be employed either in the form of lumps in a fixed bed, or moving bed operation, or in the form of finely divided particles in a fluid bed operation. Since the reducing step is conducted in a fluidized bed, it is advantageous to conduct the shift conversion in a fluidized bed. In utilizing iron oxide as a catalyst for the shift conversion, the iron oxide is continuously fed to the shift conversion zone and continuously removed. In passing through the shift conversion zone, the iron oxide is preheated by the hot gases from the reduction zone. This provides continuously fresh catalyst to the shift conversion zone and preheat for the iron ore reduction zone.

The effluent gas from the water shift conversion zone has a ratio of $H_2$ to $N_2$ of substantially 3.0. This gas, however, is not satisfactory feed to the ammonia synthesis process because of the $H_2O$ and $CO_2$ present, and a small amount of CO remaining after the shift conversion. This gas stream is treated to remove $CO_2$, $H_2O$ and any remaining CO. The remaining gas consists essentially of pure $H_2$ and $N_2$ with a ratio of $H_2$ to $N_2$ of about 3.0. This is the proper ratio for the ammonia synthesis reaction in conventional ammonia conversion or synthesis plants. This gas is then fed to the ammonia plant.

The conversion may be conventionally carried out at a temperature of about 930° F. and pressure of about 300 atmospheres. The $N_2$–$H_2$ mixture is converted to ammonia at a percent conversion per pass of about 20%.

Since the feed to the ammonia synthesis plant consists essentially of $N_2$ and $H_2$, after the removal of the converted $NH_3$ in a suitable manner, the unreacted $N_2$ and $H_2$ are recycled to the ammonia conversion plant. Ammonia is recovered from the reaction products from the ammonia synthesis reaction in a conventional manner, for example, by absorption in water. The ammonia is removed from the nonreacted product, separated from the water and stored for future use.

A summary of the reaction conditions, molar ratios of gases present in each of the gas generation steps, the iron ore reduction step and the shift conversion step, and in the ammonia synthesis step and the temperatures at which these reactions are carried out the products obtained are shown below in Table II.

TABLE II

| Effluent Gas | Gas Generator | Iron Ore Reducing | Shift Converter | Ammonia Syn. |
| --- | --- | --- | --- | --- |
| Temperature | 2,100 to 2,700 °F | 900 to 1,700 °F | 600 to 900 °F | 900 to 950 °F. |
| Pressure | 10 Atm | 10 Atm | 10 Atm | 300 Atm. |
| Fuel | $CH_4$ | | | |
| Percent $O_2$ in Oxidizing Gas | 45–50% | | | |
| Ratio CO+$H_2$/$N_2$ | 3.4 | 3.0 to 3.1 | | |
| Mole Percent ($CO_2$+$H_2$)/(CO+$H_2$) | | 0.1 to 0.2 | | |
| Mole Percent CO+$H_2$ | 70% | | | |
| Mole Percent $CO_2$+$H_2O$ | 10% | | | |
| $NH_3$ Percent Conversion | | | | Negligible. 30–35%. |
| Ratio $H_2$/CO | 2/1 | 2/1 | | |
| Ratio $H_2$/$N_2$ | | | | 30. |

Applicant's invention can be used in any process wherein an oxygen enriched gas stream is used to partially oxidize the carbonaceous fuel to produce hydrogen plus carbon monoxide to be used as a reducing gas for any iron ore reduction process.

Thus, it may be seen that in the combination process of the present invention efficient use is made of all the gases from the gasifier by controlling the composition of the gaseous components introduced therein. The gaseous effluent from the gasifier is used both to reduce iron ore and to synthesize ammonia.

This process may be also used in a direct injection iron ore reduction process where the hydrocarbons and oxygen enriched air are added directly to an iron ore reduction zone wherein the iron ore is reduced and synthesis gas is simultaneously produced by the cracking of the hydrocarbons and the reaction of the cracked hydrocarbons with oxygen and the iron oxide to form carbon monoxide, hydrogen, carbon dioxide, and water. In the direct injection process, the synthesis gas manufacture is carried out while simultaneously reducing iron ore and a separate gasification unit is not used.

The reduced iron ore may be briquetted and used as synthetic scrap or may be used in other steel making processes. The ammonia may be used to make fertilizer or for other chemical processes where ammonia is utilized. The above-described process provides an efficient method of using all the constituents of the effluent gases from the gasification unit and provides a cheap, efficient manner of making a reducing gas and an ammonia synthesis gas wherein both processes utilize a single gasification unit and the same source of fuel resulting in considerable savings of fixed equipment and fuel.

*Example I*

Natural gas (consisting essentially of $CH_4$) at a rate of about 30,700 s.c.f. per short ton of iron in the reduced product is preheated to a temperature of about 500° F. and reacted at about 10 atmospheres absolute pressure with oxygen enriched air, which is preheated to a temperature of about 1400° F. The oxygen enriched air contains about 50% of oxygen and about 50% of nitrogen. The oxygen enriched air is fed at a rate of about 1.34 s.c.f. per s.c.f. of natural gas and reacted at a temperature of about 2500° F. to crack and partially oxidize the methane gas. About 3.71 s.c.f. of synthesis gas per s.c.f. of natural gas consisting predominantly of hydrogen and carbon monoxide at a molar ratio of about 1.84 is produced. Steam at a temperature of about 400° F. is also injected into the generator at a rate of about 0.9 pound per pound mole of $CH_4$ controlling the temperature of the gasification reaction at about 2500° F. The effluent gases contain, per s.c.f. of natural gas, 2.65 s.c.f. of carbon monoxide plus $H_2$ and about 0.66 s.c.f. of nitrogen and smaller amounts of $CO_2$ plus $H_2O$. These gases are heat exchanged with cold gases from which water has been removed and further cooled to about 100° F. by direct contact with cooling water. Cooling causes condensation of most of the water present. The cool gas, after removal of the water, is heated to about 1500° F. by heat exchange with hot gas from the gas generator.

The reheated gas is then fed to the fluidized iron ore reduction unit at a rate of about 81,500 s.c.f. of CO plus $H_2$ per short ton of iron in the reduced product. The iron ore is reduced from $Fe_2O_3$ to a product in which 90% of the iron present is present as Fe. About 25% conversion of the CO plus $H_2$ to $CO_2+H_2O$ takes place during the iron ore reduction. The iron ore reduction is carried out at a temperature of about 1300° F. and a pressure of about 9 atmospheres. It is recalled that the $N_2$ does not take part in the reduction and the same amount of nitrogen will be present in the effluent gases from the iron ore reduction as were introduced to the iron ore reduction zone. To produce one short ton of iron in the reduced product requires about 30,700 s.c.f. of methane and about 41,100 s.c.f. of oxidizing gas containing about 50% oxygen. The effluent gases from the iron ore reduction zone per short ton of iron product consist essentially of 61,000 s.c.f. of CO plus $H_2$ and about 20,300 s.c.f. of $N_2$. Also present are about 23,000 s.c.f. of $CO_2$ plus $H_2O$. The height of the fluid solids bed in the reduction zones is about 25 ft The crude gases from the iron ore reduction zone consisting essentially of CO plus $H_2$ plus $N_2$ plus $CO_2$ plus $H_2O$ is cooled by direct contact with water and fed to the water shift conversion zone at a temperature of about 700° F. and a pressure of about 7 atmospheres. The water shift conversion is carried out at a temperature of about 700–800° F. and a pressure of about 7 atmospheres. About 1.1 lbs. of steam per s.c.f. of CO plus $H_2$ is added to convert the CO to $CO_2$ while converting the water to hydrogen.

In converting substantially all of the CO a total of 61,000 s.c.f. of $H_2$ per short ton of iron in the reduced product is withdrawn from the water shift conversion zone which makes a ratio of $H_2$ to $N_2$ of substantially 3 which is the proper ratio for the subsequent ammonia synthesis reaction. Prior to subjecting this stream to the ammonia synthesis reaction it is cooled down to a temperature of about 100° F. to condense and remove the water present and to scrub $CO_2$ and any small amount of CO remaining. This remaining gas mixture is fed to the ammonia synthesis reaction zone at a temperature of about 930° F. and a pressure of 300 atmospheres in the presence of a double promoted ($K_2O/Al_2O_3$) iron oxide catalyst to provide about a 20% conversion of the gases per pass to ammonia. The unreacted $H_2$ and $N_2$ are recycled to extinction. About 1.5 short tons of ammonia are produced per short ton of iron in the reduced iron ore.

In summary, it requires about 30,700 s.c.f. of methane and about 41,100 s.c.f. of oxygen enriched air containing 50% oxygen to produce one short ton of iron in the reduced ore and 1.5 short tons of ammonia.

It can be seen from the above description of the invention that an efficient, economic iron ore reduction process can be carried out in conjunction with an ammonia synthesis process whereby the low value off gases from the iron ore reduction process can be used for high value feed to an ammonia synthesis reaction zone. The advantages of carrying out the combined process as compared to carrying out the iron ore reduction process and ammonia synthesis process separately can readily be seen by the fuel requirement for each of these processes as shown below.

The iron ore reduction process was carried out separately and the B.t.u. value of the off gas calculated. About 31,900 s.c.f. of methane per ton of ore were preheated and reacted with 109,000 s.c.f. of air containing 21% oxygen. A gas containing 81,500 s.c.f. of CO plus $H_2$ was produced. This gas was used to reduce iron ore in a manner similar to that described above. The reduction was carried out at similar temperatures and pressures as described above. The off gases containing substantial amounts of nitrogen were found to have a gross heating value of about 127 B.t.u./s.c.f. (dry) giving a total heating value of $19.5 \times 10^6$ B.t.u. per ST of iron in the reduced product. To summarize, it took 31,900 s.c.f. of $CH_4$ to reduce one ton of iron ore to metallic iron and produce an off gas with a heating value of $19.5 \times 10^6$ B.t.u.

The fuel required to carry out the synthesis of about 1.5 short tons of ammonia as a separate process is as follows. In a similar manner to that described above a natural gas, consisting essentially of methane, is partially oxidized in the presence of oxygen enriched air. About 23,300 s.c.f. of methane are reacted with 36,400 s.c.f. of 44.4% $O_2$ enriched air to produce 60,900 s.c.f. of CO plus $H_2$. The ratio of CO plus $H_2$ over $N_2$ is about 3. The gasification step is carried out in such a manner that this ratio is arrived at since it is the most efficient ammonia synthesis reaction starting gas. This gas consisting of about 60,900 s.c.f. of CO plus $H_2$ is subjected to a water shift gas reaction as previously described to convert the CO to $H_2$. About 60,900 s.c.f. of $H_2$ is obtained from the water shift conversion reaction and the ratio of $H_2$ to $N_2$ is substantially 3.

The $H_2$ and $N_2$ gases are used to carry out the ammonia synthesis gas reaction as previously described. The removal of $H_2O$, $CO_2$, and CO from the stream is as described above. From the above, it can be seen that it takes about 23,300 s.c.f. of $CH_4$ to synthesize the feed for making 1.5 tons of ammonia.

In reviewing the above, that is the amount of fuel requirements for carrying out both iron ore reduction and ammonia synthesis simultaneously and for carrying out iron ore reduction alone and carrying out ammonia synthesis alone, it can be seen that by carrying out the combination process it takes 30,700 s.c.f. of methane gas and 41,100 s.c.f. of 50% oxygen enriched air to produce one ton of iron ore and 1.5 tons of ammonia. In the second case, carrying out the iron ore reduction step alone, it took 31,900 s.c.f. of methane to produce one ton of reduced iron ore. In the last case, it can be seen that it took 23,300 s.c.f. of methane and 36,400 s.c.f. of 44.4% oxygen enriched air to produce 1.5 short tons of ammonia. The results of each of these three separate situations are reported below in Table III.

TABLE III

| Reactants and Products | Case 1 | Case 2 | Case 3 |
|---|---|---|---|
| $CH_4$ | 30,700 | 31,900 | 23,300. |
| Off Gas | | 19.5 mm./s.c.f. 127 B.t.u./s.c.f. | |
| Oxidant | 41,100 s.c.f. | 109,000 s.c.f. | 36,400 s.c.f. |
| Percent $O_2$ | 50 | 21 | 44.4. |
| $NH_3$ | 1.5 ton | | 1.5 ton. |
| Fe | 1 ton | 1 ton | |

In the above it is readily seen that by carrying out the combined process substantial savings in equipment and fuel are realized. Whenever it is desirable to carry out both iron ore reduction and to manufacture ammonia at

What is claimed is:

1. A combined process for carrying out direct iron ore reduction and ammonia synthesis which comprises preparing an iron ore synthesis gas by partially oxidizing a liquid naphtha by contact of the naphtha with an oxygen enriched gas containing about 45–50% oxygen at a temperature of about 2100–2700° F. and a pressure of about 10 atmospheres to obtain a reformed naphtha fuel containing $CO+H_2$ to $N_2$ ratio of about 3.2–3.6, utilizing this synthesis gas to reduce $Fe_2O_3$ to metallic iron and to obtain an effluent gas containing a ratio of CO plus $H_2$ over $N_2$ of about 3.0–3.3, injecting steam into the effluent gas and reacting same in the presence of a catalyst at temperatures ranging from about 600° F. to about 900° F. to provide a water-gas shift conversion reaction whereby unreacted CO is converted to $CO_2$ and $H_2O$, and an equivalent molar amount is shifted to hydrogen to obtain an effluent gas containing an $H_2$ to $N_2$ ratio of about 3, which gas is subsequently subjected to temperatures ranging from about 750° F. to about 1200° F., and to pressures ranging from about 100 to about 1000 atmospheres, to produce synthesis of the hydrogen and nitrogen to form ammonia.

2. The process of claim 1 wherein the iron ore reduction step is carried out in two stages at a temperature in a range of 900–1800° F. and a pressure of 2–10 atmospheres.

3. The process of claim 1 wherein the water shift conversion reaction is carried out in a fluidized bed in the presence of an iron oxide catalyst.

4. A combined process for direct iron ore reduction and ammonia synthesis which comprises the steps of (a) partially oxidizing a hydrocarbon fuel with oxygen-enriched air to form a reducing gas mixture including CO, $H_2$ and $N_2$ in proportions providing a CO plus $H_2$ to $N_2$ ratio ranging from about 3.1 to about 4.5; (b) contacting the reducing gas mixture with iron oxides to reduce said oxides; (c) separating from said iron oxides reduction step an effluent which includes CO, $H_2$ and $N_2$ in ratio of CO plus $H_2$ to $N_2$ of from about 2.8 to about 3.5, treating the effluent to remove $CO_2$ and $H_2O$ therefrom; (d) and then subjecting the gases to temperatures ranging from about 750° F. to about 1200° F., and to pressures ranging from about 100 to about 1000 atmospheres, to produce synthesis of the hydrogen and nitrogen to form ammonia.

5. The process of claim 4 wherein a hydrocarbon fuel is partially oxidized and reformed by contact with air to which oxygen is added in concentrations ranging up to about 85% oxygen to provide an oxygen-enriched reducing gas mixture for reduction of iron oxides, and wherein the effluent from the iron oxides reduction step is admixed with steam and subjected, in the presence of a catalyst, to temperatures ranging from about 600° F. to about 900° F. in a water-gas shift conversion reaction to convert CO to $CO_2$ and $H_2O$ to $H_2$ prior to treatment to remove $CO_2$ and $H_2O$ therefrom.

6. A combined process for direct iron ore reduction and ammonia synthesis which combines the steps of (a) partially oxidizing methane with air to which oxygen has been added in concentration ranging up to about 85 percent oxygen, to form an oxygen-enriched reducing gas mixture including CO, $H_2$ and $N_2$ in proportions to provide a CO plus $H_2$ to $N_2$ ratio ranging from about 3.1 to about 4.5; (b) contacting the reducing gas mixture at temperatures ranging from about 1500° F. to about 3000° F. and at pressures ranging from about 1 to about 40 atmospheres with iron oxides to reduce said oxides to metallic irons; (c) separating effluent from said iron oxides reduction and contacting same with steam, in the presence of a fluidized iron oxide catalyst at temperatures ranging from about 600° F. to about 900° F. at pressures ranging from about 2 to about 12 atmospheres, to shift CO to $CO_2$ and $H_2O$ to $H_2$; (d) thereafter treating said effluent to remove $CO_2$ and $H_2O$ therefrom; (e) and producing ammonia by synthesis of hydrogen and nitrogen by subjecting the gases to temperatures ranging from about 750° F. to about 1200° F., and pressures ranging from about 100 to about 1000 atmospheres.

7. The process of claim 6 wherein the ammonia synthesis reaction is carried out to obtain about 10 to about 85 percent conversion per pass of the reactants to ammonia.

References Cited by the Examiner

UNITED STATES PATENTS

| | | | |
|---|---|---|---|
| 2,166,611 | 7/1939 | Shapleigh | 23—199 |
| 2,610,106 | 9/1952 | Gray | 23—199 |
| 3,148,050 | 9/1964 | Von Bogdandy | 75—34 |
| 3,168,386 | 2/1965 | Moritz et al. | 75—34 X |

OSCAR R. VERTIZ, *Primary Examiner.*

J. J. BROWN, *Assistant Examiner.*